C. J. REYNOLDS.
Lemon-Squeezer.
No. 216,699.  Patented June 17, 1879.
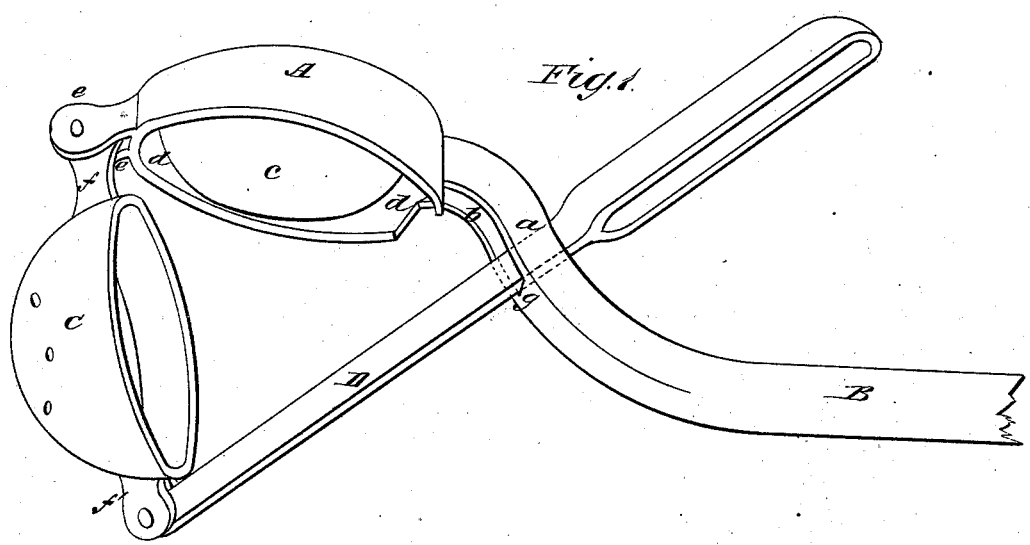
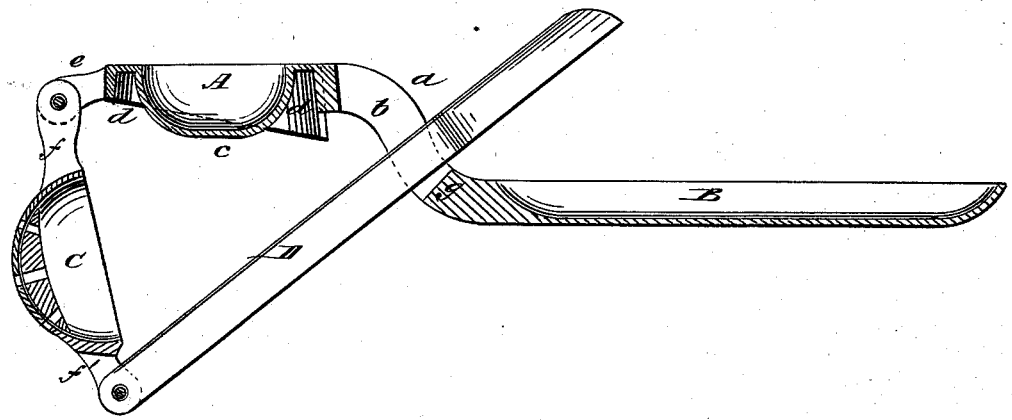
WITNESSES:
Francis McArdle
C. Sedgwick
INVENTOR:
C. J. Reynolds
BY Munn & Co
ATTORNEYS.

UNITED STATES PATENT OFFICE.

CLARENCE J. REYNOLDS, OF POUGHKEEPSIE, NEW YORK.

IMPROVEMENT IN LEMON-SQUEEZERS.

Specification forming part of Letters Patent No. 216,699, dated June 17, 1879; application filed April 12, 1879.

*To all whom it may concern:*

Be it known that I, CLARENCE J. REYNOLDS, of Poughkeepsie, in the county of Dutchess and State of New York, have invented a new and Improved Lemon-Squeezer, of which the following is a specification.

The object of this invention is to provide a lemon-squeezer with more power and greater facility of action than those now in use.

It consists of two cups, one inverted and having a convex bottom fixed to a handle with a slot through it for a lever, which connects with the under concave cup, and has its fulcrum in the handle of the first cup, whereby a powerful pressure can be brought to bear upon the lemon held between the two cups, and a thorough expression of the juice be obtained.

In the accompanying drawings, Figure 1 is a perspective view of my improvement, and Fig. 2 is a longitudinal section of the same through the center of the fixed cup.

Similar letters of reference indicate corresponding parts.

Referring to the drawings, A represents the fixed cup of the squeezer attached to a handle, B, which has a curved portion, $a$, next to the cup, through which is made a slot, $b$. The fixed cup has a convex bottom, $c$, between which and the sides of the cup is an annular space, $d$. Projecting from the side of the upper cup opposite the attachment to the handle are jaws $e$.

C is the lower cup, concave in form, and adapted to fit over the convex bottom $c$, with its edges in the space $d$. From opposite sides of this cup project ears $f f'$, the former pivoted between jaws $e$, while the latter is pivoted to the end of lever D, the arm whereof is passed through the slot $b$ in arm B. The bottom of cup C is perforated, as shown, for the escape of juice.

The manner of using the squeezer is as follows: A lemon is placed in cup C, and the lever is drawn through the slot until the lemon is held between the cup C and the convex bottom $c$. The lever now bears upon the end $g$ of the slot, which serves as a fulcrum, and the lemon is squeezed between the two cups. The powerful pressure thus exerted has the effect of expressing all the juice from the lemon.

Having thus described my invention, I claim as new and desire to secure by Letters Patent—

As an improvement in lemon-squeezers, the cup A, with the convex bottom $c$, attached to handle B, provided with a slot, $b$, in combination with concave cup C, pivoted to cup A, and lever D, pivoted to the cup C, said lever being passed through slot $b$, and having its fulcrum at $g$, whereby a powerful pressure can be brought to bear upon the lemon, substantially as described.

CLARENCE JAMES REYNOLDS.

Witnesses:
 GEO. E. CRAMER,
 WM. T. REYNOLDS.